US005954944A

United States Patent [19]

Zhang et al.

[11] Patent Number: 5,954,944

[45] Date of Patent: Sep. 21, 1999

[54] PROCESS FOR HYDROCRACKING HEAVY DISTILLATE OIL UNDER MIDDLE PRESSURE

[75] Inventors: Yanping Zhang; Yulin Shi; Zhenlin Xiong; Jianwen Shi; Hong Nie; Yahua Shi; Yigin Zhu; Zhihai Hu, all of Bejing, China

[73] Assignees: China Petrochemical Corp.; Research Institute of Petroleum Processing Sinopec, both of Beijing, China

[21] Appl. No.: 08/884,813

[22] Filed: Jun. 30, 1997

[30] Foreign Application Priority Data

| | | | |
|---|---|---|---|
| Jun. 28, 1996 | [CN] | China | 96106587 |
| Jun. 28, 1996 | [CN] | China | 96106724 |
| Jul. 22, 1996 | [CN] | China | 96109007 |

[51] Int. Cl.[6] .................................................... C10G 69/02

[52] U.S. Cl. .................... 208/89; 208/111.01; 208/111.3; 208/111.35; 208/216 R; 208/216 PP; 208/251 H; 208/254 H

[58] Field of Search ................................. 208/89, 216 R, 208/216 PP, 251 H, 254 H, 111, 111.01, 111.3, 111.35

[56] References Cited

U.S. PATENT DOCUMENTS

| | | | |
|---|---|---|---|
| 2,847,358 | 8/1958 | Kemp et al. | 196/49 |
| 3,132,089 | 5/1964 | Hass et al. | 208/89 |
| 3,159,568 | 12/1964 | Price et al. | 208/89 |
| 3,554,898 | 1/1971 | Wood et al. | 208/89 |
| 3,592,757 | 7/1971 | Baral | 208/89 |
| 3,673,112 | 6/1972 | Levinson | 502/228 |
| 3,779,903 | 12/1973 | Levinson | 208/254 H |
| 3,872,029 | 3/1975 | Takase et al. | 252/453 |
| 3,923,638 | 12/1975 | Bertolacini et al. | 208/89 |
| 4,138,326 | 2/1979 | Swift et al. | 208/108 |
| 4,175,033 | 11/1979 | Hilfman | 208/143 |
| 4,225,421 | 9/1980 | Hensley, Jr. et al. | 208/251 H |
| 4,301,037 | 11/1981 | Sanchez et al. | 502/303 |
| 4,330,395 | 5/1982 | Pott et al. | 208/115 |
| 4,367,164 | 1/1983 | Shiroto et al. | 252/457 |
| 4,401,556 | 8/1983 | Bezman et al. | 208/111 |

(List continued on next page.)

FOREIGN PATENT DOCUMENTS

| | | |
|---|---|---|
| 85104438 | 6/1985 | China . |
| 8504438 | 8/1986 | China . |
| 85100218 | 3/1987 | China . |
| 901026484 | 11/1991 | China . |
| 941000478 | 7/1995 | China . |
| 0019959 | 12/1980 | European Pat. Off. . |
| 0093552 | 11/1983 | European Pat. Off. . |
| 57-204231 | 12/1982 | Japan . |

OTHER PUBLICATIONS

English Translation Of Abstract And Claims Of CN 85104438, Jun. 1985.

English Translation Of Abstract And Claims Of CN 941000478, Jul. 1995.

English Translation Of Abstract Of CN 85100218, Mar. 1987.

English Translation Of Abstract And Claims Of CN 90102648.4, Nov. 1991.

Abstract Of CN 85100218 Of Mar. 1987.

*Primary Examiner*—Walter D. Griffin
*Attorney, Agent, or Firm*—Ladas & Parry

[57] ABSTRACT

A process for producing middle distillates by hydrocracking a heavy distillate oil under middle pressure uses a hydrofining catalyst and a hydrocracking catalyst in series and once-through operation. The once-through volume conversion to 350° C.—products is up to 80 vol. %. The yield and selectivity of middle distillates are greater than 40 wt % and less than 50 wt %, respectively. The process is particularly suited to treat heavy distillate oil having the nitrogen content of up to 1500 ppmw, the sulfur content of up to 3.5 wt % and dry point in the boiling range of higher than 500° C. to produce the feed for reforming process, jet fuel, the low sulfur content diesel, the feed for catalytic cracker and the feed for producing ethylene.

15 Claims, 1 Drawing Sheet

U.S. PATENT DOCUMENTS

| | | | |
|---|---|---|---|
| 4,419,271 | 12/1983 | Ward | 502/65 |
| 4,435,278 | 3/1984 | Chen | 208/251 H |
| 4,454,026 | 6/1984 | Hensley, Jr. et al. | 208/251 H |
| 4,456,701 | 6/1984 | Chen | 502/314 |
| 4,483,942 | 11/1984 | Sekido et al. | 502/255 |
| 4,517,073 | 5/1985 | Ward et al. | 208/111 |
| 4,549,957 | 10/1985 | Hensley, Jr. et al. | 208/251 H |
| 4,563,434 | 1/1986 | Ward et al. | 502/66 |
| 4,576,711 | 3/1986 | Ward et al. | 208/111 |
| 4,618,594 | 10/1986 | Tait et al. | 502/66 |
| 4,672,048 | 6/1987 | Ward | 502/66 |
| 4,686,030 | 8/1987 | Ward | 208/216 |
| 4,766,099 | 8/1988 | Dufresne et al. | 502/72 |
| 4,791,090 | 12/1988 | Pereira et al. | 502/355 |
| 4,816,538 | 3/1989 | Abdo | 502/66 |
| 4,844,792 | 7/1989 | Abdo et al. | 208/111 |
| 4,859,312 | 8/1989 | Miller | 208/111 |
| 4,891,127 | 1/1990 | Murrel et al. | 208/111 |
| 4,894,142 | 1/1990 | Steigleder | 208/111 |
| 4,908,344 | 3/1990 | Pereira et al. | 501/313 |
| 4,957,895 | 9/1990 | Nebesh et al. | 502/228 |
| 4,976,848 | 12/1990 | Johnson | 208/216 R |
| 5,089,463 | 2/1992 | Johnson | 502/313 |
| 5,378,671 | 1/1995 | Keville et al. | 502/64 |
| 5,506,182 | 4/1996 | Yamagishi et al. | 502/66 |

PROCESS FOR HYDROCRACKING HEAVY DISTILLATE OIL UNDER MIDDLE PRESSURE

FIELD OF THE INVENTION

The present invention relates to a process for catalytically converting heavy distillate oil. More particularly, the invention relates to a process for the production of middle distillates by catalytically hydrocracking heavy distillate oil under middle pressure in the presence of hydrogen.

BACKGROUND OF THE INVENTION

Hydrocracking is a petroleum refining process wherein the molecules of a hydrocarbonaceous material are partially decomposed in the presence of hydrogen to obtain a more desirable lower molecular weight hydrocarbon product. In recent years, the tendency of crude oil to become heavier and more difficult to refine is growing more significant day after day world wide. Meanwhile, the demand for middle distillates such as jet and diesel fuel is continuously increasing. This had led to a rapid development of hydrocracking technique. Much development work has been done into finding novel catalysts and improved hydrocracking conditions.

EP-A2-0093552 discloses a single stage hydrocracking process. The hydrotreating catalyst was arranged in a single reactor with the hydrocracking catalyst and ahead of it. The conditions used in the process include pressure of 5.25 to 7.0 MPa, temperature of 360 to 440° C. and LHSV of 0.1 to 10 $hr^{-1}$. The volume conversion to 345° C.-products is 30 to 40 volume percent. The feedstock for the process is a heavy oil fraction having an initial boiling point of 200° C. and normally of 340° C. or higher such as coker heavy gas oil. The hydrotreating catalyst used in the process is a conventional denitrogenation catalyst and generally comprises one or more metals from Groups VIA and VIIIA of the Periodic Table supported on an amorphous, porous carrier such as silica, alumina or silica-alumina. The hydrocracking catalyst used in the process comprises one or more metals from Group VIA and VIIIA supported on a large pore zeolite such as zeolite X, zeolite Y or mordenite. One of the drawbacks of the process is that to achieve good distribution of the product of hydrocracking, the feedstock must be hydrocracked at limited conversion not greater than 50 volume percent to 345° C.-distillate.

U.S. Pat. No. 4,686,030 discloses a process for mild hydrocracking a hydrocarbon feedstock containing nitrogen, sulfur components and feed components boiling it above 700° F. (371° C.) Typical mild hydrocracking conditions used in the process include temperature of 500 to 900° F. hydrogen pressure of 200 to 1500 psig and LHSV of 0.05 to 3.0 $hr^{-1}$. In the process between about 10 and 50 volume percent of the feed components boiling above 700° F. are simultaneously converted to product components boiling at or below 700° F. The catalyst used in the process is Mo—Ni—P supported on an amorphous porous refractory oxide and has a pore size distribution wherein at least 70 percent of the pore volume is in pores of diameter in the range from about 50 angstroms to about 130 angstroms and less than 10 percent of said pore volume is in pores of diameter greater than 110 angstroms.

U.S. Pat. No. 4,859,312 and EP-A2-0019959 disclose a process for producing middle distillates by hydrocracking (and isomerizating) heavy oils. But both processes require that the organic nitrogen content of the feed be less than 50, preferably less than 10 ppmw.

The present invention therefore provides a process for producing middle distillates by hydrocracking a heavy distillate oil using novel hydrofining catalyst and hydrocracking catalyst. The process can be operated at middle pressure with once-through volume conversion of up to 80 volume percent, is suited to treat a poor-quality feedstock with the nitrogen content up to at 1500 ppmw and the nitrogen content of the charge to be contacted with the hydrocracking catalyst can be allowed up to 150 ppmw.

SUMMARY OF THE INVENTION

The present invention provides a process for producing middle distillates by hydrocracking a heavy distillate oil which comprises the steps of:

(1) contacting the heavy distillate oil with a hydrofming catalyst at hydrofining conditions to hydrofine the heavy distillate oil; and (2) contacting the hydrofined heavy distillate oil without intermediate separation with a hydrocracking catalyst at hydrocracking conditions to hydrocrack the hydrofined heavy distillate oil, wherein said hydrofining catalyst comprises, based on the total weight of the catalyst, 1–5% (wt.) nickel oxide, 12–35% (wt.) tulngsten oxide, 1–9% (wt.) fluorine, and the balancing amount of composite alumina as the carrier, said composite alumina is composed of one or more kinds of micropore alumina and one or more kinds of macropore alumina, wherein the weight ratio of micropore alumina to macropore alumina is 75:25 to 50:50, wherein micropore alumina has a pore size distribution wherein greater than 95 percent of the pore volume is in pores of diameter less than 80 angstroms, while macropore alumina has a pore size distribution wherein greater than 70 percent of the pore volume is in pores of diameter in the range from 60 to 600 angstroms, the pore size distribution mentioned above is determined by BET method of nitrogen adsorption at low temperature; and said hydrocracking catalyst is composed of, based on the total weight of the catalyst, 0.5–5.0 wt % fluorine, 2.5–6.0 wt % nickel oxide, 10–38 wt % tungsten oxide and a carrier, said carrier is composed of 20–90 wt % alumina and 10–80 wt % zeolite wherein the zeolite is a mesopore or macropore zeolite with an acidity strength value of 1.0–2.0 mmol/g determined by $NH_3$-TPD, and the alumina has an acidity strength value of 0.5–0.8 mmol/g determined by $NH_3$-TPD.

BRIEF DESCRIPTION OF THE DRAWING

The FIGURE is a simplified flowsheet showing one form of the process of the invention.

The process of the invention may suitably be carried out in a system shown in the FIGURE.

Figure 1:
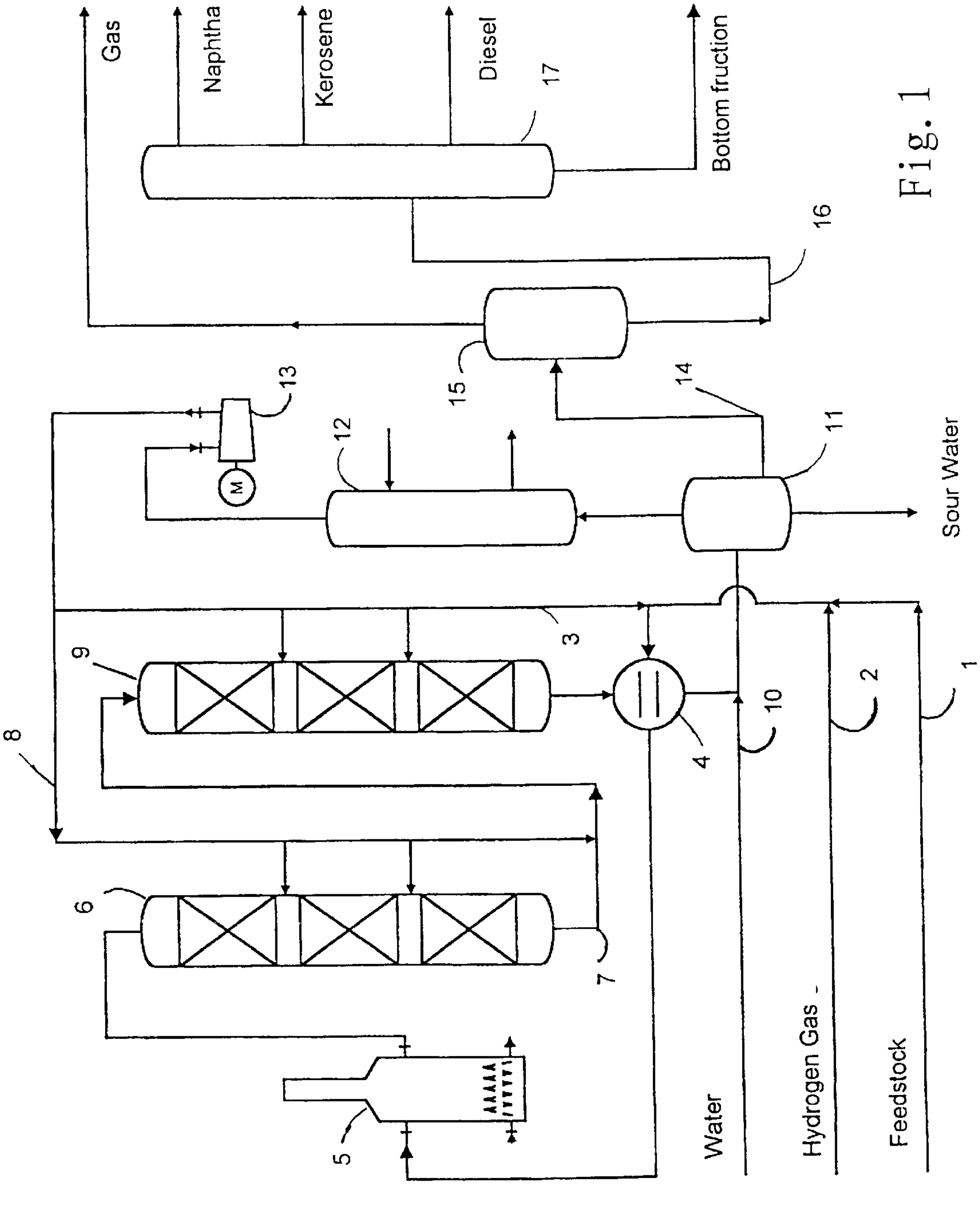

Referring to the FIGURE, a heavy distillate oil enters the system through line 1 and is mixed with hydrogen gas from line 2 and recycled hydrogen from line 3. Then the mixture passes through heat exchanger 4 and then to heater 5 in which it is raised to a suitable temperature for the reaction. The heated mixture firstly enters the hydrofining reactor 6 in which it contacts the hydrofining catalyst. The catalyst packed in the reactor is divided into two or more catalyst beds, and between beds there is introduced quenching hydrogen from line 8 to control the inlet temperature of catalyst beds. The effluent from the hydrofining reactor enters hydrocracker 9 through line 7. In the hydrocracker the oil and hydrogen further contact with the hydrocracking catalyst to form required product. Similarly the hydrocracking catalyst packed in the hydrocracker is divided into two or more catalyst beds and quenching hydrogen is introduced between beds to control the inlet temperature of the beds. The hydrocracker effluent then goes through the heat exchanger 4 to give heat to the feedstock. After heat exchanger the effluent is mixed with water from line 10 to wash up ammonia and a part of hydrogen sulfide which are formed in reactors. The mixture then goes to a high pressure gas/liquid separator 11 in which the recycled hydrogen, sour water and liquid product are separated. The recycled hydrogen from separator 11 enters an amine scrubber 12 in which hydrogen sulfide is separated in a conventional manner. The purified hydrogen is then compressed to operating pressure in compressor 13 from which it enters the high pressure hydrogen circuit. The hydrocracker product leaves separator 11 and then passes to a low pressure gas/liquid separator 15 through line 14. In the low pressure separator 15 gas (C4-) is separated from the liquid product which is fractionated in tower 17 to yield naphtha, kerosene, diesel and bottom fractions.

The hydrofining catalyst may also be arranged in a single reactor with the hydrocracking catalyst and located upstream of the hydrocracking catalyst, as disclosed in EP-A2-0093552.

DETAILED DESCRIPTION OF THE INVENTION

Hydrofining Catalyst

The hydrofining catalyst used in the process of the present invention is composed of, based on the total weight of the catalyst, 1–5% (wt.) nickel oxide, 12–35% (wt.) tungsten oxide, 1–9% (wt.) fluorine, and the balancing amount of composite alumina as the carrier. Said composite alumina is composed of one or more kinds of micropore alumina and one or more kinds of macropore alumina. Said composite alumina is preferably composed of one kind of micropore alumina and one kind of macropore alumina. The weight ratio of micropore alumina to macropore alumina depends on the specific distillate to be treated. Increasing the amount of micropore alumina cap be adopted when a light distillate is processed; while a heavy distillate is processed, increasing the amount of macropore alumina can be adopted. When the distillate having boiling range of 80–550° C. is hydrofined, the weight ratio of micropore alumina to macropore alumina should be: 75:25 to 50;50, in this case, the composite alumina preferably has the following pore distribution: greater than 75% of the pore volume is in pores of diameter in the range from 40 to 100 angstroms.

The composite alumina in the hydrofining catalyst has the conventional specific surface area and the pore volume of the catalyst carrier generally used for the preparation of hydrofining catalyst. Its specific surface area is preferably more than 200 $m^2/g$, more preferably more than 220 $m^2/g$, and its pore volume is preferably more than 0.3 ml/g, more preferably more than 0.4 ml/g.

The detailed procedures for the preparation of this catalyst are as follows:

1. Carrier Preparation:

A precursor of micropore alumina and a precursor of macropore alumina in the required ratio are uniformly mixed. The obtained mixture is shaped by the conventional shaping method for the hydrofining catalyst, and then subjected to a calcination treatment at 550–650° C. for 3–5 hours to obtain the composite alumina as the carrier.

2. Fluorine Impregnation:

The above-obtained composite alumina is impregnated with an aqueous solution containing fluorine, then dried at 100–130° C., and calcined for 3–5 hours at 400–600° C.

3. Nickel—tungsten Impregnation:

The above-obtained composite alumina containing fluorine is impregnated with an aqueous solution containing nickel and tungsten, then dried at 100–130° C. and calcined for 3–5 hours at 400–600° C.

The precursor of micropore alumina described above is preferably the hydrated alumina with the boehmite content more than 60% (wt.), which is prepared preferably by sodium meta-aluminate-carbon dioxide method; while the precursor of macropore alumina described above is preferably hydrated alumina with boehmite content more than 50% (wt.), which is prepared preferably by sodium meta-aluminate-aluminium sulfate method.

The conventional shaping method above-mentioned includes tableting, balling and extruding, wherein the method of extruding is preferred.

Said aqueous solution containing fluorine refers to the aqueous solution of fluorine-containing inorganic compound (s) such as ammonium fluoride and/or hydrogen fluoride.

Said aqueous solution containing tungsten and nickel generally refers to the mixed aqueous solution of ammonium meta-tungstate, ammonium tungstate, ammonium ethyl meta-tungstate or nickel meta-tungstate and nickel nitrate or nickel acetate.

The hydrofining catalyst can be used under the conventional hydrocracking condition. Before its use it should be pre-sulfided using a conventional process.

Hydrocracking Catalyst

The hydrocracking catalyst used in the process of the present invention is composed of, based on the total weight of the entire catalyst, 0.5–5.0 wt % fluorine, 2.5–6.0 wt % nickel oxide and 10–38 wt % tungsten oxide loaded on a catalyst carrier. Said catalyst carrier is composed of 20–90 wt % alumina and 10–80 wt % zeolite wherein the zeolite is macropore or macropore zeolite with acidity strength value of 1.0–2.0 mmol/g determined by $NH_3$-TPD and the alumina has an acidity strength value of 0.5–0.8 mmol/g determined by $NH_3$-TPD.

In the above-mentioned catalytically active compounds fluorine is preferably 1.0–4.0 wt % nickel oxide is preferably 2.6–5.0 wt % and tungsten oxide is preferably 19–25 wt % on the basis of the total weight of the entire catalyst. In the above-mentioned catalyst carrier, alumina is preferably 50–80 wt %, and zeolite is preferably 20–50wt %.

The process for the preparation of the catalyst of the present invention reads as follows.

(1) Preparation of Catalyst Carrier

A hydrated alumina and a zeolite are used for the preparation of the catalyst carrier of the present invention. The hydrated alumina which can form alumina of an acidity strength value of 0.5–0.8 mmol/g after being calcined under certain conditions is used. The calcining temperature is 500–650° C., and the calcining time duration is 2–8 hours or longer. The alumina obtained by calcining hydrated alumina under such conditions has a pore volume preferably of greater than 0.3 ml/g and a specific surface area preferably of greater than 200 $m^2/g$.

The hydrated alumina can be prepared by sodium meta-aluminate-carbon dioxide process, alkyl aluminum or alkoxy aluminum hydrolysis process, or sodium meta-aluminate-aluminum sulfate process.

For example, the hydrated alumina can be prepared by the lower carbon alkoxy aluminum hydrolysis process disclosed in Chinese patent CN 85100218B. Specifically, $C_1$–$C_4$ alkoxy aluminum, preferably aluminum isopropoxide, and lower carbon alcohol with a water content less than 20 wt %, preferably 4–15 wt %, such as water-containing isopropyl alcohol, react at 5–120° C. for 1–96 hours, preferably 1–16 hours under the condition of a water amount controlled to be approaching but not greater than the water amount stoichiometrically required for the lower carbon alkoxy aluminum hydrolysis. Then the lower carbon alcohol containing less than 0.2 wt % water is evaporated out. Then deionized water is added to the solid product for aging at 5–100° C. for 1–120 hours, preferably at 78–100° C. for 6–40 hours and then water-containing isopropyl alcohol is evaporated out. The solid product thus obtained is dried at 110–120° C. and the hydrated alumina is readily obtained.

The hydrated alumina preferably is the hydrated alumina with a boehmite content greater than 60 wt %.

The zeolite is macropore or macropore zeolite with an acidity strength value of 1.0–2.0 mmol/g determined by $NH_3$-TPD. Such zeolite can be selected from the group of faujasite, mordenite, ZSM-5 zeolite, Beta zeolite and Ω zeolite. Said zeolite can be modified using various methods, such as ion exchange, impregnation etc. The preferable zeolite is hydrogen form Y-zeolite or rare earth form Y-zeolite or mordenite.

The term "acidity strength value" used in the present application refers to the acidity strength value determined by ammonia temperature programmed desorption ($NH_3$-TPD). The specific determining steps run as follows.

A small amount of the sample to be tested is taken and put into a thermogravimetric analyser, and high purity nitrogen gas flow is introduced. The weight of the sample is measured after the temperature is increased to 500° C., and the weight $W_1$ of the sample is recorded. Then the temperature is decreased to 150° C. and high purity ammonia gas is introduced until there appears an adsorption equilibrium. The temperature is kept constant for one hour so as to remove the ammonia gas physically adsorbed, then the weight $W_2$ of the sample after ammonia adsorption is recorded. Then the temperature is increased to 500° C. at a programmed temperature ramp of 10° C./minute, the weight loss curve is recorded, and the weight $W_3$ of the sample after removal of ammonia is recorded. Acidity strength value of the sample is calculated out by the following formula:

$$\text{Acidity Strength Value} = \frac{W_2\ (\text{mg}) - W_3\ (\text{mg})}{W_1\ (g) \times \text{molecular weight of ammonia}}\ (\text{mmol/g})$$

wherein thermogravimetric analyser may use, e.g., 951 thermogravimetric analyser of the 9900 thermal analysis system made by Du Pont Corporation.

The hydrated alumina selected according to the above standard and the zeolite selected according to the above standard are homogeneously mixed in a predetermined ratio, shaped, dried and calcined to readily obtain the catalyst carrier.

For the preparation of the carrier of the hydrocracking catalyst, it is possible to mix the hydrated alumina selected according to the above standard with the zeolite selected according to the above standard, or to mix several kinds of the hydrated alumina selected according to the above standard with several kinds of the zeolite selected according to the above standard.

The hydrated alumina and the zeolite should be mixed under such a condition that after hydrated alumina and zeolite are mixed, shaped, dried and calcined, the content of alumina is 20–90 wt %, preferably 50–80 wt % of the entire catalyst carrier.

The shaping method is a conventional method in the art such as tabletting, balling or extruding etc. The present invention selects preferably the extruding method.

The calcining temperature indicated above is 500–650° C., and the calcining time duration is 3–5 hours or longer.

(2) Loading of Active Components

Fluorine, nickel oxide and tungsten oxide should be loaded on the carrier obtained by the above-described process.

The loading of fluorine may use a conventional impregnation method, i.e., the carrier is impregnated with a predetermined amount of fluorine-containing aqueous solution, and is then dried and calcined. Said fluorine-containing aqueous solution refers to the aqueous solution of fluorine-containing inorganic compound, such as ammonium fluoride and/or hydrogen fluoride. The drying is carried out generally at 100–130° C. and then the calcining is carried out at 400–500° C. for 3–5 hours.

The amount of fluorine loaded on the carrier is generally 0.5–5.0 wt % of the entire catalyst, preferably 1.0–4.0 wt %.

The loading of nickel-tungsten may also use conventional impregnation method, i.e., the fluorine-containing carrier obtained according to the method described above is impregnated with a nickel-tungsten-containing aqueous solution, then is dried and calcined. Said nickel-tungsten-containing aqueous solution is generally an aqueous solution of ammonium meta-tungstate, ammonium tungstate, ammonium ethyl meta-tungstate or nickel meta-tungstate and nickel nitrate or nickel acetate. The nickel—tungsten-containing aqueous solution should be in such a concentration that the contents of nickel and tungsten in the catalyst obtained reach required values. The drying is generally carried out at 100–130° C. and the calcining is carried out at 400–500° C. for 3–5 hours.

The amount of nickel loaded on the carrier should be made to have the nickel oxide occupying 2.5–6.0 wt % of the entire catalyst, preferably 2.6–5.0 wt %. The amount of tungsten loaded on the carrier should be made to have the tungsten oxide occupying 10–38 wt % of the entire catalyst, preferably 19–25 wt %.

The hydrocracking catalyst used in the process of the present invention can be used under the conventional hydrocracking conditions. Before its use, it should be pre-sulfided using conventional process.

Feedstock for the process of the invention The feedstock for the process of the invention comprises various feetstocks for the conventional hydrocracking process. Because the process of the invention uses the combination of the hydrofining catalyst and the hydrocracking catalyst in series, the hydrofining catalyst has excellent denitrogenation, desulfurization and aromatic hydrogenation properties and the hydrocracking catalyst has excellent nitrogen resistant ability (the nitrogen content of the charge for the hydrocracker can be allowed up to 1500 ppmw), the process of the invention is particularly suited to treat high nitrogen and sulfur content heavy distillate oil having, for example, dry point in the boiling range of higher than 500° C., preferably 500 to 580° C., the nitrogen content of up to 500 ppmw and the sulfur content of up to 3.5 wt % such as straight-run gas oil, vacuum gas oil, coker gas oil and catalytic cracker cycle oil blended with residual oil.

It is preferred that the nitrogen content of the heavy distillate oil is not greater than 1300 ppm, the sulfur content is not greater than 3.0 wt %. In that case, catalyst life before regeneration in the process may be not less than one year.

Process Conditions

As mentioned above, the process of the invention uses the combination of a hydrofining catalyst and a hydrocracking catalyst in series. Both catalysts can be arranged in a single reactor or separate reactors. The conditions for hydrofining reaction and the conditions for hydrocracking reaction may be substantially the same or different. The temperature of hydrofining and hydrocracking reactions can be controlled by hydrogen quenching. The volume ratio of hydrogen to oil in the hydrocracking stage may be adjusted by hydrogen from line 8.

The conditions for the hydrofining reaction and those for the hydrocracking reaction include hydrogen partial pressure of 6.0 to 10 MPa, preferably 6.5 to 9.5 MPa, average reaction temperature of 340 to 440° C., preferably 350 to 420° C., a volume ratio of hydrogen to oil of 400 to 1200, preferably 600 to 1000 and LHSV of 0.1 to 3.0 $hr^{-1}$, preferably 0.2 to 1.0 $hr^{-1}$. Hydrogen partial pressure is usually at least 85 percent of the total system pressure.

The relative proportions of the hydrofining and hydrocracking catalysts may be varied according to the nature of the feedstock. The poorer the quality of the feedstock the greater then will be the relative proportion of the hydrofining catalyst to the hydrocracking catalyst. In general, the volume ratio of the hydrofining catalyst to hydrocracking catalyst of 25:75 to 75:25 will be used.

When large amounts of carbon residue, asphaltene or metals are present in the feedstock, a protective agent may be arranged at upstream of the hydrofining catalyst to prevent that the pressure drop of the catalyst beds quickly reaches to the limit value and thereby to ensure the extended operational period of the system. The amount of the protective agent added is usually from 1 to 20 percent by volume, based on the hydrofining catalyst volume, depending on the nature of the feedstock.

The above process conditions can be varied according to the type and nature of the feedstock, the desired product distribution and various combinations of the process of the invention with other petroleum processing units. This will be apparent to those skilled in the art.

The process of the invention may be operated in a newly constructed middle pressure reactor or a modified existing middle pressure reactor.

EXAMPLES

The following examples further illustrate the present invention, but are not going to limit the present invention.

Examples 1–5

These examples illustrate the preparation method of the catalyst carrier of the present invention.

The precursor of micropore alumina used in these examples is a commercial product prepared by sodium meta-aluminate-carbon dioxide method (the first kind of hydrated alumina), which is so-called Dried Pseudo-Boehmite available from Shandong Aluminium Factory, China, containing 80% (wt.) boehmite and 5% (wt.) bayerite. The specific surface area and pore size distribution of micropore alumina (B) obtained after being calcined for 4 hours at 550° C. are listed in Table 1. The precursor of macropore alumina used in these examples is a commercial product prepared by sodium meta-aluminate-aluminium sulfate method (the second kind of hydrated alumina), which is so-called Changling Xerogel Powder, available from the Catalyst Plant of the Changling Petroleum Refinery, China, containing 68% (wt.) boehmite and 5% (wt.) bayerite. The specific surface area and pore size distribution of macropore alumina (C) obtained after being calcined for 4 hours at 550° C. are listed in Table 1. These two kinds of hydrated alumina in the required weight ratio (see Table 1) are uniformly mixed and thereto the appropriate amounts of extruding aid, binding agent and water are added, then the obtained mixture is extruded into trilobular bars with the circumscribed circle diameter of 1.4 mm, subsequently dried at 120° C. and calcined for 4 hours at 550–650° C. to obtain composite aluminae D-H as the carrier, respectively. Their specific surface area and pore size distribution data determined by using BET method of nitrogen adsorption at low temperature are listed in Table 1.

TABLE 1

| | | | Example No. | | | | |
|---|---|---|---|---|---|---|---|
| | | | 1 | 2 | 3 | 4 | 5 |
| Alumina No. | B | C | D | E | F | G | H |
| First hydrated Alumina/ Second hydrated Alumina (wt/wt, on dry basis) | — | — | 75:25 | 75:25 | 75:25 | 70:30 | 50:50 |
| Calcining Temperature, ° C. | 550 | 550 | 620 | 550 | 650 | 550 | 550 |
| Calcining Time, hr | 4 | 4 | 4 | 4 | 4 | 4 | 4 |
| Specific Surface Area, $m^2/g$ | 236 | 262 | 236 | 248 | 217 | 232 | 228 |
| Pore Volume, ml/g | 0.40 | 0.63 | 0.49 | 0.49 | 0.49 | 0.49 | 0.52 |
| Pore size Distribution, angstrom, % | | | | | | | |
| 20–40 | 13.0 | 0.9 | 5.9 | 8.2 | 4.1 | 5.6 | 3.4 |
| 40–60 | 54.1 | 19.9 | 24.2 | 41.7 | 18.7 | 23.6 | 18.1 |
| 60–80 | 30.6 | 49.9 | 60.1 | 42.2 | 66.9 | 60.9 | 60.1 |
| 80–100 | 0.8 | 15.5 | | | | | |
| 100–600 | 1.5 | 13.8 | 9.8 | 7.8 | 10.3 | 9.9 | 18.4 |

Examples 6–16

These examples illustrate the preparation method of the catalyst of the present invention.

A certain amount of composite aluminae D-H prepared in Examples 1–5 is weighted respectively, and then impregnated with a certain amount of the aqueous solution containing ammonium fluorine (chemically pure) for 1 hour, then dried at 120° C. and subsequently calcined at a certain temperature for 4 hours, respectively to obtain composite alumina containing fluorine. Table 2 shows the amounts of each material, calcining temperature and time duration.

The composite alumina carrier containing fluorine is impregnated with a certain amount of the mixed aqueous solution containing ammonium meta-tungstate (chemically pure) and nickel nitrate (chemically pure) for 4 hours, then dried at 120° C. and subsequently calcined at a certain temperature for 4 hours, respectively to obtain Catalysts I-S. Table 3 shows the amounts of each material, calcining temperature and time duration. Table 4 shows the active component contents of the catalyst, wherein the measurement method of the contents of NiO and $WO_3$ is described in "Petrochemical Analysis Methods (RIPP Test Methods)", published in the Science Press (1990), p. 360–361. The measurement method of fluorine content is described in the same book, 185–187.

TABLE 2

| | Carrier | | Fluorine Impregnation | | Calcining Conditions | |
|---|---|---|---|---|---|---|
| | | | $NH_4F$ | Water | | Time |
| Example No. | No. | amount, g | Amount, g | Amount, ml | Temp. ° C. | Duration, hr |
| 6 | D | 50 | 6.0 | 33 | 530 | 4 |
| 7 | E | 200 | 22.6 | 132 | 530 | 4 |
| 8 | E | 50 | 6.6 | 33 | 450 | 4 |
| 9 | E | 50 | 6.0 | 33 | 500 | 4 |
| 10 | E | 50 | 6.0 | 33 | 530 | 4 |
| 11 | E | 50 | 6.0 | 33 | 530 | 4 |
| 12 | E | 50 | 6.0 | 33 | 530 | 4 |
| 13 | E | 50 | 12.6 | 33 | 530 | 4 |
| 14 | F | 50 | 6.0 | 33 | 530 | 4 |
| 15 | G | 200 | 22.6 | 132 | 530 | 4 |
| 16 | H | 200 | 22.6 | 132 | 530 | 4 |

TABLE 3

| | Nickle-Tungsten Impregnation | | | Calcining Conditions | |
|---|---|---|---|---|---|
| | Nickle Nitrate | Ammonium Meta-tungstate | Water | | Time |
| Example No. | Amount, g | Amount, g | Amount, ml | Temp., ° C. | Duration, hr |
| 6 | 6.0 | 17.5 | 32 | 500 | 4 |
| 7 | 24.2 | 70.0 | 128 | 500 | 4 |
| 8 | 6.0 | 17.5 | 32 | 500 | 4 |
| 9 | 6.0 | 17.5 | 32 | 500 | 4 |
| 10 | 6.0 | 17.5 | 32 | 420 | 4 |
| 11 | 6.0 | 17.5 | 32 | 480 | 4 |
| 12 | 11.7 | 10.8 | 32 | 500 | 4 |
| 13 | 4.3 | 27.4 | 32 | 500 | 4 |
| 14 | 6.0 | 17.5 | 32 | 420 | 4 |
| 15 | 24.2 | 70.0 | 128 | 500 | 4 |
| 16 | 24.2 | 70.0 | 128 | 500 | 4 |

TABLE 4

| Example | Catalyst | Catalyst Active Component Contents (wt %) | | |
|---|---|---|---|---|
| No. | No. | $WO_3$ | NiO | F |
| 6 | I | 22.0 | 2.3 | 4.0 |
| 7 | J | 21.3 | 2.3 | 4.0 |
| 8 | K | 22.0 | 2.3 | 3.9 |
| 9 | L | 22.1 | 2.3 | 3.9 |
| 10 | M | 22.0 | 2.3 | 4.1 |
| 11 | N | 21.9 | 2.3 | 4.0 |
| 12 | O | 14.0 | 4.8 | 2.0 |
| 13 | P | 30.0 | 1.5 | 7.6 |

TABLE 4-continued

| Example | Catalyst | Catalyst Active Component Contents (wt %) | | |
|---|---|---|---|---|
| No. | No. | $WO_3$ | NiO | F |
| 14 | Q | 21.8 | 2.3 | 3.9 |
| 15 | R | 22.0 | 2.3 | 4.0 |
| 16 | S | 22.0 | 2.3 | 4.0 |

Example 17

140 g of precursor of micropore alumina (a commercial product prepared by sodium meta-aluminate-carbon dioxide method, available from Shandong province Aluminium Factory, China) and 60 g of precursor of macropore alumina (a commercial product prepared by sodium meta-aluminate-aluminium sulfate method, available from changling Petroleum Refinery, China) are uniformly mixed and thereto the proper amount of extruding aid, binding agent and water is added. Then the obtained mixture is extruded into trilobular bars with the circumscribed circle diameter of 1.4 mm, dried at 120° C., and calcined at 550° C. for 4 hours to obtain a catalyst carrier. The carrier is impregnated with an aqueous solution containing 12 g $NH_4F$ for 1 hour, then dried at 120° C. and calcined at 500° C. for 4 hours to obtain a carrier containing fluorine. Then the carrier containing fluorine is impregnated with an aqueous solution containing 35.5 g of ammonium meta-tungstate and 12 g of nickel nitrate for 4 hours, then dried at 120° C., and calcined at 480° C. for hours to obtain catalyst 17 having the following active components: $WO_3$ 22.1 wt %, NiO 2.3 wt % and F 4.1 wt %.

In the following examples 18–26, hydrated alumina A and hydrated alumina B are respectively used, wherein hydrated alumina A is prepared according to the process disclosed in Chinese patent No. CN 85100218B. The specific preparing process reads as follows:

5588 grams of isopropyl alcohol containing 13.2 wt % water are added to a reactor equipped with a stirrer and a reflux condenser, and heated to boiling, then, 2941 grams of molten aluminum isopropoxide are added dropwise thereto. After refluxing of 6 hours, 3555 grams of isopropyl alcohol containing 0.2 wt % water are evaporated out and then to the reactor 8.8 liters of deionized water are added for aging at 80° C. for 16 hours, at the same time as of being aged, the water-containing isopropyl alcohol is evaporated out and the solid product obtained is dried at 120° C. to obtain hydrated alumina A.

Hydrated alumina B is a commercial product manufactured by the sodium meta-aluminate-carbon dioxide process, produced by Shangtong Aluminum Factory, China under the product designation of "dried pseudo-boehmite".

Table 5 gives out the content of boehmite of the above hydrated aluminae as well as acidity strength value, the specific surface area and the pore volume of the aluminae obtained by calcining hydrated aluminae for 4 hours at 550° C. 600° C. as well as 650° C. The specific surface area and the pore volume are determined by BET method of nitrogen adsorption at low temperature.

In the following examples 18–26, hydrogen form Y-zeolite (HY), rare earth form Y-zeolite (REY) and hydrogen form mordenite (HM) are respectively used.

Table 6 gives out the silica to alumina ratio, the acidity strength value, and the rare earth oxide content of the above zeolites.

Among them, the rare earth oxide content is determined by X-ray fluorescent spectrometry (refer to "Petrochemical Analysis Methods (RIPP Test Methods)", p.p.368–370, Science Press, 1990).

TABLE 5

| | Hydrated alumina | | | | | |
|---|---|---|---|---|---|---|
| | No. | | | | | |
| | A | | | B | | |
| hydrated alumina | | | | | | |
| content of boehmite (wt %) | | 68 | | | 62 | |
| calcining temperature (° C.) | 550 | 600 | 650 | 550 | 600 | 650 |
| alumina | | | | | | |
| acidity strength value (mmol/g) | 0.7156 | 0.7028 | 0.6760 | 0.6700 | 0.6565 | 0.6214 |
| specific surface area ($m^2/g$) | 268 | 252 | 240 | 292 | 278 | 265 |
| pore volume (ml/g) | 0.61 | 0.61 | 0.60 | 0.41 | 0.40 | 0.40 |

TABLE 6

| | Zeolite | | |
|---|---|---|---|
| | zeolite type | | |
| | HY | REY | HM |
| $SiO_2/Al_2O_3$ | 4.8 | 4.8 | 7.4 |
| acidity strength value (mmol/g) | 1.5672 | 1.2365 | 1.8562 |
| rare earth oxide content (wt %) | 0 | 3.8 | 0 |

Examples 18–24

These examples relate to the preparation of the hydrocracking catalyst used in the process of the present invention.

(1) Preparation of the Catalyst Carrier

Predetermined amounts of hydrated alumina A and hydrated alumina B are mixed homogeneously with a predetermined amount of hydrogen form Y-zeolite (HY), rare earth form Y-zeolite (REY) and hydrogen form mordenite (HM) respectively. Then adequate amounts of extruding aid, binding agent, and water are added thereto. The mixture obtained is then extruded into trilobular bars of a circumscribed circle diameter of 1.8 mm which are then dried and calcined.

Table 7 gives the amounts of the starting materials as well as the calcining temperature and time duration in the preparing procedures of the catalyst carrier.

(2) Loading of Fluorine

A predetermined amount of the above carrier is impregnated with aqueous solution of ammonium fluoride for 1 hour, and calcined after being dried at 120° C.

Table 8 gives out the amount of the carrier, the amounts of ammonium fluoride as well as the calcining temperature and time duration.

(3) Impregnation of Nickel—Tungsten

A predetermined amount of ammonium meta-tungstenate and nickel nitrate aqueous solution is used to impregnate the above fluorine-containing carrier for 4 hours.

The catalyst provided by the present invention is readily obtained after being dried at 120° C. and calcined.

Table 9 gives out the amounts of ammonium meta-tungstate and nickel nitrate as well the calcining temperature and time duration.

Table 10 gives out the contents of the various active components in the catalyst manufactured, wherein the contents of NiO and $WO_3$ are determined using plasma emission spectrometry (ICP/AES) (refer to "Petrochemical Analysis Methods (RIPP Test Methods)" p.p. 360–361, Science Press, 1990), and the content of fluorine is determined using fluorine ion electrode (refer to the same book, p.p. 185–187).

The catalysts manufactured by Examples 18–24 are respectively referred to as catalysts 18–24.

TABLE 7

| | Preparation of catalyst carrier | | | | | |
|---|---|---|---|---|---|---|
| | hydrated alumina | | zeolite | | calcining conditions | |
| Example No. | type | amount* (g) | type | amount* (g) | temperature (° C.) | time (hour) |
| Example 18 | hydrated alumina A | 75 | Zeolite HY | 25 | 500 | 4 |
| Example 19 | hydrated alumina A | 75 | Zeolite HY | 25 | 600 | 4 |
| Example 20 | hydrated alumina A | 75 | Zeolite HY | 25 | 650 | 4 |

TABLE 7-continued

| Preparation of catalyst carrier | | | | | | |
|---|---|---|---|---|---|---|
| | hydrated alumina | | zeolite | | calcining conditions | |
| Example No. | type | amount* (g) | type | amount* (g) | temperature (° C.) | time (hour) |
| Example 21 | hydrated alumina A | 60 | Zeolite HY | 40 | 600 | 4 |
| Example 22 | hydrated alumina A | 75 | Zeolite REY | 25 | 600 | 4 |
| Example 23 | hydrated alumina B | 75 | Zeolite HY | 25 | 600 | 4 |
| Example 24 | hydrated alumina B | 65 | Zeolite HM | 35 | 600 | 4 |

*The amounts of hydrated alumina and zeolite are given on dry basis.

TABLE 8

| Impregnation of fluorine | | | | | |
|---|---|---|---|---|---|
| | impregnation of fluorine | | | | |
| | carrier | ammonium fluoride | water | calcining conditions | |
| Example No. | amount (g) | amount (g) | amount (ml) | temperature (° C.) | time (hour) |
| Example 18 | 100 | 1.5 | 200 | 420 | 4 |
| Example 19 | 100 | 5.5 | 200 | 450 | 4 |
| Example 20 | 100 | 13.1 | 200 | 450 | 4 |
| Example 21 | 100 | 4.1 | 200 | 450 | 4 |
| Example 22 | 100 | 4.4 | 200 | 450 | 4 |
| Example 23 | 100 | 6.4 | 200 | 450 | 4 |
| Example 24 | 100 | 1.5 | 200 | 450 | 4 |

TABLE 9

| Impregnation of nickel-tungsten | | | | | |
|---|---|---|---|---|---|
| | nickel-tungsten impregnation | | | | |
| | nickel nitrate | ammonium meta-tungstate | water | calcining conditions | |
| Example No. | amount (g) | amount (g) | amount (ml) | temperature ° C. | time (hour) |
| Example 18 | 43.1 | 72.5 | 250 | 420 | 4 |
| Example 19 | 65.4 | 163.0 | 250 | 450 | 4 |
| Example 20 | 55.8 | 126.8 | 250 | 450 | 4 |
| Example 21 | 87.7 | 220.2 | 250 | 450 | 4 |
| Example 22 | 71.8 | 170.2 | 250 | 450 | 4 |
| Example 23 | 73.4 | 150.7 | 250 | 450 | 4 |
| Example 24 | 44.7 | 180.4 | 250 | 450 | 4 |

TABLE 10

| Contents of active components of catalyst | | | | |
|---|---|---|---|---|
| | | catalyst active component contents (wt %) | | |
| Example No. | catalyst No. | F | NiO | $WO_3$ |
| Example 18 | Catalyst 18 | 0.5 | 2.7 | 10.0 |
| Example 19 | Catalyst 19 | 1.9 | 4.1 | 22.5 |
| Example 20 | Catalyst 20 | 4.5 | 3.5 | 17.5 |
| Example 21 | Catalyst 21 | 1.4 | 5.5 | 30.4 |
| Example 22 | Catalyst 22 | 1.5 | 4.5 | 23.5 |

TABLE 10-continued

| Contents of active components of catalyst | | | | |
|---|---|---|---|---|
| | | catalyst active component contents (wt %) | | |
| Example No. | catalyst No. | F | NiO | $WO_3$ |
| Example 23 | Catalyst 23 | 2.2 | 4.6 | 20.8 |
| Example 24 | Catalyst 24 | 0.5 | 2.8 | 24.9 |

Examples 25

185 g of hydrated alumina A and 50 g of hydrogen form Y-zeolite (HY) are homogeneously mixed. Then proper amount of extruding aid, binding agent, and water is added thereto. The mixture obtained is then extruded into trilobular bars having a circumscribed circle diameter of 1.8 mm which are dried at 120° C. and calcined at 600° C. for 4 hours to obtain a carrier. The carrier is impregnated with an aqueous solution containing 26 g of ammonium fluoride for 1 hour. The impregnated carrier is dried it 120° C. and calcined at 500° C. for 4 hours to obtain a fluorine-containing carrier. Then the carrier is impregrated with an aqueous solution containing 150 g of ammonium meta-tungstate and 65 g of nickel nitrate for 4 hours and the impregnated carrier is dried at 120° C. and calcined at 480° C. for 4 hours to obtain catalyst 25 having the following active components: $WO_3$ 20.8 wt %, NiO 4.0 wt. % and F 2.0 wt %.

Example 26

185 g of hydrated alumina A and 150 g of hydrogen form Y-zeolite (HY) are homogeneously mixed. Then proper amount of extruding aid, binding agent, and water are added thereto. The mixture obtained is then extruded into trilobular bars having a circumscribed circle diameter of 1.8 mm which are dried at 120° C. and calcined at 600° C. for 4 hours to obtain a carrier. The carrier is impregnated with an aqueous solution containing 10 g of ammonium fluoride for 1 hour. The impregnated carrier is dried at 120° C. and calcined at 500° C. for 4 hours to obtain a fluorine-containing carrier. Then the carrier is impregnated with an aqueous solution containing 145 g of ammonium meta-tungstate and 72 g of nickel nitrate for 4 hours and the impregnated carrier is dried at 120° C. and calcined at 480° C. for 4 hours to obtain catalyst 26 having the following active components: $WO_3$ 19.0 wt %, NiO 4.6 wt. % and F 1.2 wt %.

In examples 27, 28 and 29, the following feedstocks were used: A-vacuum gas oil from Saudi Arabia middle crude oil; B-vacuum gas oil from intermediate base crude oil in China; and C-a 69:31 weight blend of diesel obtained by catalytic cracking a heavy oil blended with residual oil and straight-run light vacuum gas oil. The properties of these feedstocks are set out in Table 11 below.

TABLE 11

| | Feedstock No. | | |
|---|---|---|---|
| | A | B | C |
| Boiling range, ° C. | 299–553 | 267–532 | 204–402 |
| Density @ 20° C., g/cm$^3$ | 0.9235 | 0.8877 | 0.8425 |
| Carbon, wt % | 85.20 | 86.03 | 86.74 |
| Hydrogen, wt. % | 11.61 | 12.98 | 13.13 |
| Sulfur, wt. %. | 3.10 | 0.66 | 0.07 |
| Nitrogen, ppmw | 898 | 1300 | 548 |
| Basic Nitrogen, ppmw | 212 | 447 | 252 |
| Solidifying point, ° C. | 31 | 40 | 14 |
| Aniline point, ° C. | 77.5 | 91.0 | 73.8 |
| $C_5$ insolubles, wt. % | 0.04 | 0.15 | — |
| Carbon residue*, wt. % | 0.23 | 0.10 | 0.05 |
| Viscosity @ 20° C., mm$^2$/s | 12.7 | 26.4 | 6.30 |
| Composition, wt. % | | | |
| Paraffins | 18.2 | — | 41.4 |
| Cyclo-paraffins | 26.5 | — | 29.4 |
| Paraffins and cyclo-paraffins | — | 69.2 | — |
| Aromatics | 53.6 | 27.2 | 28.4 |
| gum | 1.7 | 3.6 | 0.8 |

*determined by electric furnace method

Example 27

This example uses Feedstock A.

A 0.41 reactor was charged with 0.31 of the hydrofining catalyst 17 and hydrocracking catalyst 25. The volume ratio of the hydrofining catalyst 17 to the hydrocracking catalyst 25 is 50:50. Before the reaction, the catalysts are pre-sulfided with a 2 wt. % solution of carbon disulfide in kerosene at 300° C. or below under hydrogen atmosphere, for 28 hours. Then, feedstock A is contacted with the catalysts under the following operating conditions: the hydrogen partial pressure 9.3 MPa (the total pressure 11.3 MPa), the temperature (for hydrofining/hydrocracking reaction) 383/380° C., LHSV 0.5 hr$^{-1}$ and the volume ratio of hydrogen to oil 1000. The nitrogen content of the hydrofined feedstock for the hydrocracking reaction is 25.3 ppmw. The once-through volume conversion to 350° C.-product is 63.7 vol. %. The results are set out in Table 12 below.

TABLE 12

| | Boiling range ° C. | | | | |
|---|---|---|---|---|---|
| | <65 | 65–145 | 145–260 | 260–350 | >350 |
| Product distribution, wt. % | 3.61 | 20.57 | 31.12 | 14.98 | 29.72 |
| Density @ 20° C./ (g/cm$^3$) | 0.6546 | 0.7441 | 0.8042 | 0.8236 | 0.8359 |
| Sulfur, ppmw | — | — | 9.2 | 21 | 23 |
| Nitrogen, ppmw | <0.5 | <0.5 | 0.8 | 0.8 | 1.3 |
| Saturated hydrocarbon, wt. % | 97.46 | | | | |
| Aromatic potential content, wt. % | | 58.59 | | | |
| Viscosity @ 20° C., mm$^2$/s | | | 1.7 | 7.1 | |

TABLE 12-continued

| | Boiling range ° C. | | | | |
|---|---|---|---|---|---|
| | <65 | 65–145 | 145–260 | 260–350 | >350 |
| Freezing point, ° C. | | | <−50 | | |
| Solidifying point, ° C. | | | | −28 | 39 |
| Aromatic, vol. % | | | 10.7 | | |
| Smoke point, mm | | | 22.7 | | |
| Naphthalene series, vol. % | | | 0.14 | | |
| Cetane number | | | | 61.8 | |
| K Factor | | | | | 12.85 |
| BMCI Value | | | | | 10.4 |

As seen from Table 12, the process of the invention can convert the heavy distillate oil having high sulfur and aromatic content under middle pressure to light naphtha having the content of saturated hydrocarbons of up to 97 wt. %; heavy naphtha having the nitrogen content of less than 0.5 ppmw and aromatic potential content of up to 58 wt. %; kerosene fraction smoke point and aromatic content of which satisfy the specifications for jet fuel; diesel fraction having the sulfur content of 21 ppmw, solidifying point of −28° C. and cetane number of about 62; and bottom fraction having K factor of greater than 12, BMCI value of less than 11, the sulfur content of 23 ppmw and the nitrogen content of 1.3 ppmw. The yield and selectivity of the 145 to 350° C. middle distillate are 46 wt. % and 65.6 wt. %, respectively.

Example 28

This example uses feedstock B.

The reactor, catalysts used, the total volume of the catalysts, the volume ratio of the hydrofining catalyst 17 to the hydrocracking catalyst 25 and the pre-sulfidization of the catalysts are the same as described in Example 27. The operating conditions are summarized as follows: the hydrogen partial pressure 6.4 MPa (total pressure 7.5 MPa), temperature (for hydrofining/hydrocracking reaction) 391/384° C., LHSV 0.5 hr$^{-1}$ and the volume ratio of hydrogen to oil 1000. The nitrogen content of the hydrofined feedstock for the hydrocracking stage is 46 ppmw. The once-through volume conversion to 350° C.-product is 55.9 vol. %. The results are set out in the Table 13 below.

TABLE 13

| | Boiling range ° C. | | | | |
|---|---|---|---|---|---|
| | <65 | 65–145 | 145–215 | 215–370 | >370 |
| Product distribution, wt. % | 2.96 | 16.85 | 18.26 | 28.45 | 33.48 |
| Density @ 20° C./ (g/cm$^3$) | | 0.7440 | 0.8022 | 0.8266 | 0.8269 |
| Sulfur, ppmw | | | 9.7 | 29.6 | 34 |
| Nitrogen, ppmw | <0.5 | <0.5 | 0.5 | 1.0 | 1.5 |
| Saturated hydrocarbon, wt. % | 96.81 | | | | |
| Aromatic potential content, wt. % | | 57.50 | | | |
| Viscosity @ 20° C., mm$^2$/s | | | 1.4 | 5.1 | |
| Freezing point, ° C. | | | <−50 | | |
| Solidifying point, ° C. | | | | −8 | 42 |
| Aromatic, vol. % | | | 16.0 | | |
| Smoke point, mm | | | 20.7 | | |

TABLE 13-continued

| | Boiling range ° C. | | | | |
|---|---|---|---|---|---|
| | <65 | 65–145 | 145–215 | 215–370 | >370 |
| Naphthalene series, vol. % | | | <1 | | |
| Cetane number | | | | 62.8 | |
| K Factor | | | | | 12.98 |
| BMCI Value | | | | | 5.90 |

As seen from Table 13, the process of the invention can convert the high nitrogen content heavy distillate oil under middle pressure to as high quality products as in Example 27. The yield and selectivity of 145 to 370° C. middle distillate are 46.7 wt % and 70.2 wt. %, respectively.

Example 29

This example uses feedstock C.

The same reactor as used in Example 27 was charged with 0.31 of the hydrofining catalyst 17 and the hydrocracking catalyst 26. The volume ratio of catalyst 17 to catalyst 26 is 60:40. The pre-sulfidiization of the catalysts is the same as described in Example 27. The operating conditions are summarized as follows: the hydrogen partial pressure 7.8 MPa (total pressure 9.2 MPa), temperature (hydrofining/hydrocracking reaction) 360/367° C., LHSV 0.85 $hr^{-1}$ and the volume ratio (for hydrofining/hydrocracking stage) 807/1003. The one-through volume conversion to 350° C.-products is 77.0 vol. %. The results are set out in Table 14 below.

TABLE 14

| | Boiling range ° C. | | | | |
|---|---|---|---|---|---|
| | <65 | 65–145 | 145–260 | 260–350 | >350 |
| Product distribution, wt. % | 3.50 | 18.58 | 41.93 | 25.91 | 7.60 |
| Density @ 20° C./($g/cm^3$) | 0.6494 | 0.7265 | 0.7920 | 0.7974 | 0.8117 |
| Sulfur, ppmw | | | 4.5 | 4.9 | 4.5 |
| Nitrogen, ppmw | <0.5 | <0.5 | <0.5 | 0.6 | 4.1 |
| Saturated hydrocarbon, wt. % | 99.52 | | | | |
| Aromatic potential content, wt. % | | 48.87 | | | |
| Viscosity @ 20° C., $mm^2/s$ | | | 2.0 | 7.1 | |
| Freezing point, ° C. | | | −49 | | |
| Solidifying point, ° C. | | | | −8 | |
| Aromatic, vol. % | | | 5.4 | | |
| Smoke point, mm | | | 30 | | |
| Cetane number | | | | >75 | |
| K Factor | | | | | 12.95 |
| BMCI Value | | | | | 3.6 |

As seen again from Table 14, the process of the invention can produce under middle pressure the various high quality products. The yield and selectivity of 145 to 350° C. middle distillate are 67.8 wt. % and 75.4 wt. %, respectively.

We claim:

1. A process for producing middle distillates by hydrocracking a heavy distillate oil which comprises the steps of:

(1) contacting the heavy distillate oil with a hydrofining catalyst at hydrofining conditions to hydrofine the heavy distillate oil; and (2) contacting the hydrofined heavy distillate oil without intermediate separation with a hydrocracking catalyst at hydrocracking conditions to hydrocrack the hydrofined heavy distillate oil, wherein said hydrofining catalyst has the following composition based on the total weight of the catalyst 1–5% (wt. %) nickel oxide, 12–35% (wt.) tungsten oxide, 1–9% (wt.) fluorine, and the remainder composite alumina as a carrier, wherein said composite alumina is obtained by shaping and calcining a mixture of a precursor of one or more kinds of micropore alumina and a precursor of one or more kinds of macropore alumina, wherein the weight ratio of micropore alumina to macropore alumina in the calcined composite alumina is 75:25 to 50, said micropore alumina has a pore size distribution wherein greater than 95% of the pore volume is in pores of diameter less than 80 angstroms, while said macropore alumina has a pore distribution wherein greater than 70% of the pore volume is in pores of diameter in the range of 60 to 600 angstroms, the pore distribution mentioned above being determined by the BET method of nitrogen adsorption at low temperature; and wherein said hydrocracking catalyst has the following composition based on the total weight of the catalyst; 0.5–5 weight percent fluorine, 2.5–6 wt % nickel oxide, 10–38 wt % tungsten oxide and a carrier, said carrier consisting essentially of 20–90 wt. % alumina and 10 wt % zeolite wherein the zeolite is macropore or macropore zeolite with an acidity strength value of 1.0–2.0 mmol/g determined by $NH_3$-TPD, and the alumina has an acidity strength value of 0.5–0.8 mmol/g determined by $NH_3$-TPD.

2. A process according to claim 1, wherein hydrofining conditions and hydrocracking conditions include a hydrogen partial pressure of 6.0 to 10 MPa, temperature of 340 to 440° C., a volume ratio of hydrogen to oil of 400 to 1200 and LHSV of 0.1 to 3.0 $hr^{31\ 1}$.

3. A process according to claim 1, wherein the volume ratio of the hydrofining catalyst to the hydrocracking catalyst is from 25:75 to 75:25.

4. A process according to claim 1, wherein the heavy distillate oil has a dry point in the boiling range of 500 to 580° C., a nitrogen content of up to 1500 ppmw and a sulfur content of up to 3.5 wt %.

5. A process according to claim 4, wherein the heavy distillate oil is straight-run gas oil, vacuum gas oil, coker gas oil or catalytic cracker cycle oil blended with residual oil.

6. A process according to claim 1, wherein said composite alumina is composed of one kind of micropore alumina and one kind of macropore alumina.

7. A process according to claim 1, wherein said micropore alumina is derived from a hydrated alumina with the boehmite content more than 60% (wt), and said macropore alumina is derived from a hydrated alumina with boehmite content more than 50% (wt).

8. A process according to claim 1, wherein said composite alumina has a pore size distribution wherein greater than 75% of the pore volume is in pores of diameter in the range from 40 to 100 angstroms.

9. A process according to claim 1, wherein the specific surface area of said composite alumina is greater than 220 $m^2/g$, and the pore volume of said composite alumina is greater than 0.4 ml/g.

10. A process according to claim 1, wherein the hydrocracking catalyst contains 1–4 wt % fluorine, 2.6–5.0 wt % nickel oxide, and 19–25 wt % tungsten oxide.

11. A process according to claim 1, wherein the hydrocracking catalyst carrier is composed of 50–80 wt % alumina and 20–50 wt % zeolite.

12. A process according to claim 1, wherein said zeolite is selected from the group consisting of faujasite, mordenite, ZSM-5 zeolite, Beta zeolite and Ω zeolite, and the mixture thereof.

13. A process according to claim 1 wherein said zeolite is selected from the group consisting of hydrogen form or rare earth form Y-zeolite and hydrogen form mordenite.

14. A process according to claim 1, wherein said alumina in the hydrocracking catalyst is obtained by calcining one or more kinds of hydrated alumina prepared by a process selected from sodium meta-aluminate-carbon dioxide process, alkyl aluminum or alkoxy aluminum hydrolysis process, and sodium meta-aluminate-aluminum sulfate process.

15. A process according to claim 14, wherein said hydrated alumina contains more than 60 wt % boehmite.

* * * * *